Figure 1A:
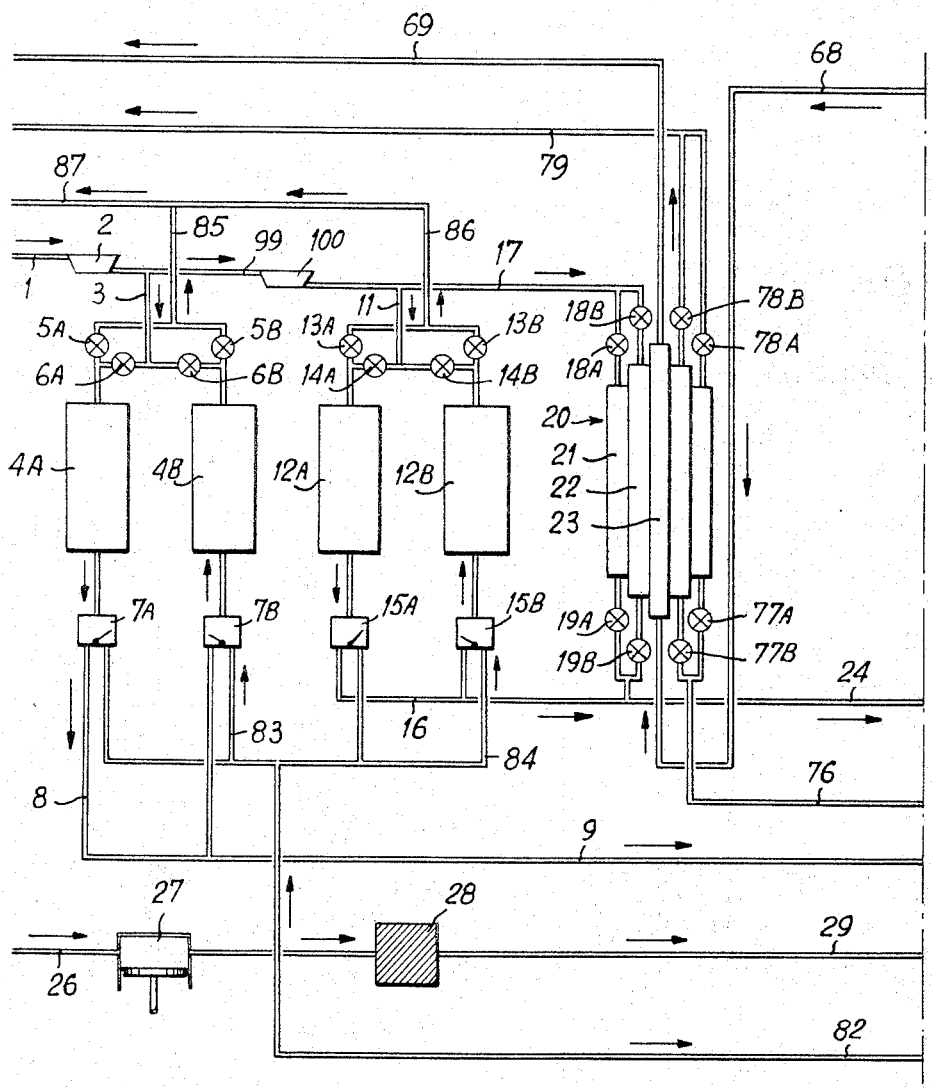

3,333,434
PROCESS FOR SEPARATING OXYGEN FROM AIR
Jacques Fred Grunberg, Outremont, and Wayne Arnold Platt, Westmount, Quebec, Canada, assignors to l'Air Liquide, Societe Anonyme pour l'Etude et l'Exploitation des Procedes Georges Claude
Filed Aug. 17, 1964, Ser. No. 390,087
Claims priority, application France, Aug. 21, 1963, 945,277, Patent 1,377,370
6 Claims. (Cl. 62—13)

The present invention concerns a process of separating oxygen and oxygen-rich air containing more than about 40% oxygen, by liquefaction and rectification of air at low temperature in at least two columns under different pressures in indirect heat exchange, in which the air is separated in the rectification column under a higher pressure—on one hand into a liquid rich in oxygen, of which the first part is expanded and introduced into the column under a lower pressure, and a second part is expanded and vaporised by heat exchange with a gas poorer in oxygen, then introduced into the column under a lower pressure—and on the other hand into gaseous nitrogen, of which a first part is liquefied by heat exchange with the liquid oxygen from the column under a lower pressure, and a second part by heat exchange with an oxygen-rich liquid.

There was already proposed a process of this type, that only permitted however the production of oxygen-rich air containing about 70% oxygen, or additionally of a minor amount of pure oxygen by addition of a supplementary rectification column, in U.S. patent application S.N. 260,190, of Feb. 21, 1963, now U.S. Patent No. 3,209,548.

In the process described in that earlier patent application, a first part of the gaseous nitrogen separated in the rectification column under a higher pressure is condensed by heat exchange with part of the liquid rich in oxygen previously taken off from this same column and expanded, and a second part is condensed by heat exchange with the liquid containing about 70% oxygen separated in the column under a lower pressure. The part of the liquid rich in oxygen from the column under a higher pressure, vaporised by heat exchange with the first part of the gaseous nitrogen, is then introduced at the bottom of the column under a lower pressure, whilst the other part of this liquid is expanded and introduced in the usual manner into the column under a lower pressure.

That earlier process allows the pressure of the column under a higher pressure to be reduced, and hence also the consumption of energy required, if the liquid containing about 70% oxygen is vaporised under a lower pressure than that of the rectification column at low pressure; this implies however that the oxygen-rich air containing 70% oxygen is evacuated from the separation plant under a slightly subatmospheric pressure. On the other hand, the process does not permit the production of large amounts of pure oxygen, as well as oxygen-rich air with about 70% oxygen, and for example does not permit the production of pure oxygen and of 70% oxygen-rich air in amounts of the same order of magnitude.

The process of the present invention, by contrast, allows the above drawbacks to be avoided and to separate oxygen and oxygen-rich air containing more than about 40% oxygen from the air, in comparable amounts, with an energy consumption notably smaller than that of the usual processes of separation of air, and using essentially similar apparatus; it allows in addition an increased yield of oxygen from air, in excess of 90%.

The process of the present invention is characterised in that the gas poorer in oxygen used to effect the vaporization of the second part of the liquid rich in oxygen from the column under a higher pressure is air under a pressure intermediate those of the two columns, which after its liquefaction is introduced into at least a rectification column, and in that the liquid rich in oxygen used to effect the liquefaction of the second part of the nitrogen is at least part of the oxygen-rich air to be separated and not yet vaporized.

The following improvements may also be used separately or in combinations:

(a) At least the greater part of the liquid liquefied under a pressure intermediate close those of the two columns is pressurised up to a pressure to that of the column under a higher pressure, and then introduced into this latter column;

(b) The oxygen-rich air in the liquid state is brought to a pressure higher than that of the column under a low pressure, before its vaporization by heat exchange with a second part of the liquid nitrogen;

(c) The cold output necessary for the separation of the air is provided by expansion with external work of a third part of the gaseous nitrogen separated in the column under a higher pressure, which is heated before this expansion at least in part by heat exchange with a fraction of air previously brought to a pressure appreciably higher than that of the column under a higher pressure and purified and cooled independently of the rest of the air to be separated, then liquefied and introduced into a rectification column.

Figure 1B:
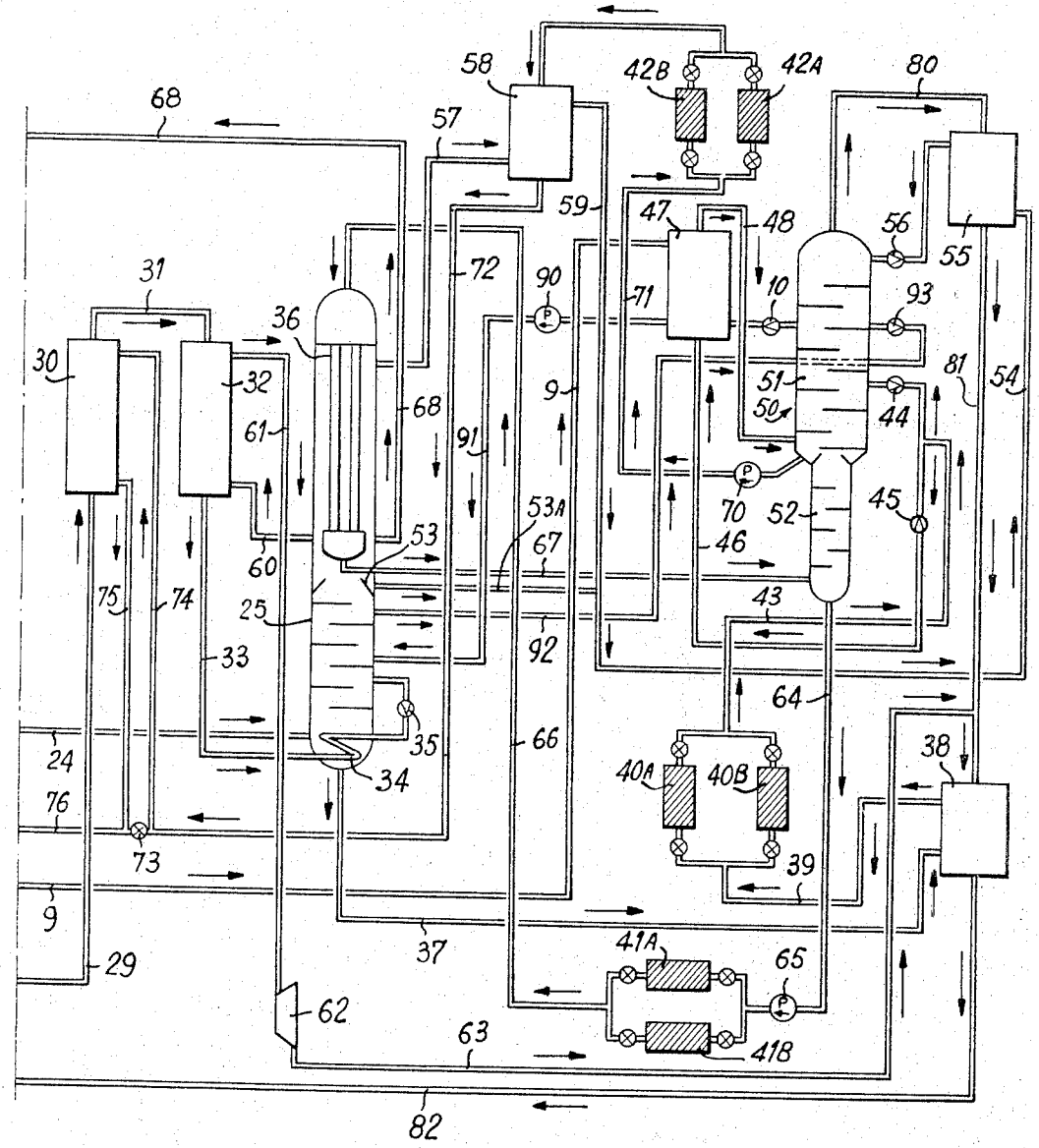
Figure 2:
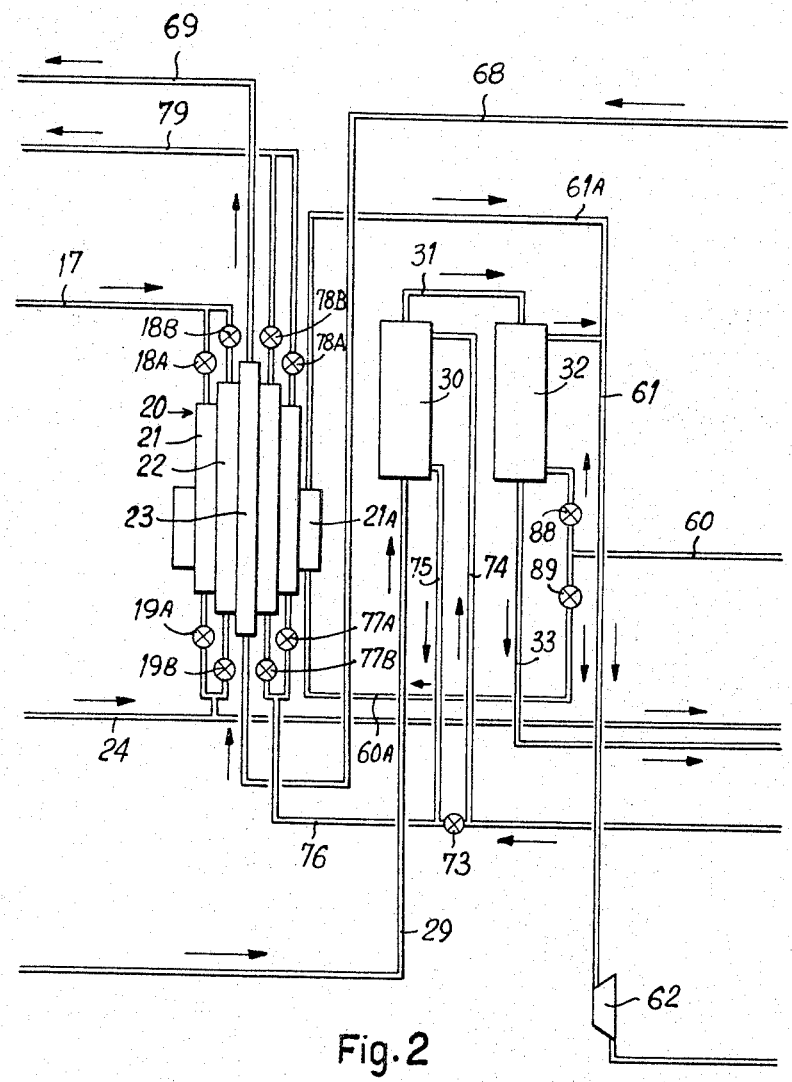

There now follows a description by way of a non-limiting example, referring to the attached drawing, of an apparatus for the production of pure oxygen (99.5%) and of oxygen-rich air containing 70% oxygen, in substantially equal proportions, by low-temperature rectification of air. FIGURES 1A and 1B show the whole of the apparatus, while FIGURE 2 represents a modification of part of this apparatus.

The greater part of the air to be separated, coming through pipe 1, is brought by turbo-compressor 2 to about 2.2 bars absolute. A first fraction of the air, comprising about 20% to 25% of the total, is sent by pipe 3 to the set of cooling regenerators 4A, 4B, in which, in the usual way, the air is cooled to —174° C. (approximately) and deposits its impurities (moisture and carbon dioxide) in contact with the packing of one of the regenerators, whilst a separate stream of cold nitrogen in counter-current warms up and vaporizes the impurities deposited in the other regenerator, the flows of hot gas and cold gas in the regenerators being alternated periodically by means of a valve set 5A, 5B, 6A, 6B at their warm end and by valve boxes shown schematically at 7A, 7B at their cold end. After being thus cooled to about its dew-point, the air passes by pipes 8 and 9 to the heat exchanger 47, where it is liquefied by heat exchange with a fraction of the liquid 46 rich in oxygen from the rectification column under a higher pressure 25. A fraction of the air thus liquefied (about 5% of the total amount of air treated) is expanded in valve 10 to about 1.3 bars and introduced into the upper part 51 of the rectification column under a lower pressure 50; the other fraction is brought by the pump 90 to a pressure of about 5.8 bars and introduced by the pipe 91 into the lower zone of the column under a higher pressure 25. If, however, it is necessary to avoid the introduction into the column 50 of any liquid which has not been previously freed of impurities of low volatility, such as acetylene and other hydrocarbons whose accumulation in the liquid oxygen may risk causing explosion, the expansion valve 10 is kept closed and all the air liquefied in the column 25 under pressure is passed through the pipe 91. Accordingly from this last column a liquid of composition very close to that of air, in a quantity substantially the same as the quantity of liquid air passing through valve 10 when this is opened, is drawn off by pipe 92, a little above the level of pipe 91, expanded in valve 93, and introduced into the upper part of the column under a low pressure 50, at substantially the same level as that of the introduction by valve 10.

The second fraction of air under 2.2 bars coming from compressor 2 is sent through pipe 99 to the turbocompressor 100, which brings it to about 5.8 bars absolute. It is then divided into two parts. The first part, in an amount corresponding to the rest of the separated nitrogen (about 50 to 55% of the total volume of air treated) is introduced through pipe 11 into one of the two regenerators 12A, 12B, in which it is cooled to about its dew point (that is —171.5° C. approximately) and deposits its impurities, whilst the other regenerator is swept by a fraction of the separated nitrogen undergoing warming up. These regenerators are also subjected to periodic switching, by means of the valve system 13A, 13B, 14A, 14B, at their warm end and by valve boxes 15A, 15B, at their cold end. The air thus cooled and purified is taken by pipes 16 and 24 to the bottom of the rectification column under pressure 25.

The second part of the air under 5.8 bars is introduced by the pipe 17 into a series of channels in the reversing exchanger shown schematically at 20. This exchanger comprises (non-reversing) channels 23 through which passes the pure separated oxygen, and groups of reversing channels 21 and 22 through which flow alternately the air to be cooled and the oxygen-rich cold air containing 70% oxygen, the reversals being provided by means of the valve sets 18A, 18B, 78A, 78B at the warm end, and 19A, 19B, 77A, 77B, at the cold end. The air, cooled to around —171.5° C. and purified, leaves through valves 19A or 19B, and is then added by pipe 24 to the air cooled in the set of regenerators 12A, 12B, and introduced with it into the column under higher pressure 25.

Moreover, a small amount of air (about 3% of the total amount of air to be separated) is carried through pipe 26 to the compressor 27, which brings it to a pressure of about 15 bars absolute, is then dried and freed from carbon dioxide in a device represented schematically at 28, for example a set of adsorbers at around atmospheric temperature of the type described in U.S. patent application S.N. 243,884, of December 11, 1962, now U.S. Patent No. 3,242,645.

This fraction of air under relatively high pressure then passes by pipe 29 to the heat exchanger 30 where it is cooled in counter-current with part of the 70% oxygen-righ air, then by pipe 31 to the exchanger 32, where it is cooled again by heat exchange with the gaseous nitrogen taken off from the top of the column under pressure 25 to be expanded with external work in turbine 62. It is finally liquefied in coil 34 at the bottom of the column under pressure 25, then expanded in valve 35 and introduced into this column a little above the main fraction of air in the gaseous state.

In the usual way, the air is separated in the column under pressure 25, fitted at its top with a condenser 36, into a liquid containing about 40% oxygen and into nitrogen. The liquid containing 40% oxygen collected in the sump of the column flows by pipe 37 to exchanger 38, where it is subcooled by heat exchange with the gaseous nitrogen separated at the head of the column under a low pressure 50. It is then carried by pipe 39 to the set of filters 40A, 40B, designed to provide the elimination of any trace of impurities (hydrocarbons, and in particular acetylene) that may be present in suspension in the liquid, one of the filters being in use while the other is being regenerated. The oxygen-rich liquid drawn off from the filter set by the pipe 43 is then divided into two parts. The first one is expanded through valve 44 to about 1.3 bars absolute and introduced into the upper part 51 of the column 50 under low pressure. The other part is expanded through the valve 45 to about 1.3 bars absolute, then taken by pipe 46 to the exchanger 47, in counter-current to the air at low pressure coming by pipe 9 from the regenerators 4A, 4B; it vaporizes causing liquefaction of the air, then is introduced by pipe 48 into the bottom of the upper part 51 of the column under a low pressure 50.

Of the nitrogen separated at the head of the column under pressure 25, one part is collected as a liquid at 53 below the condensor 36; it is sent by pipes 53A and 54 to the exchanger 55, which effects its subcooling in counter-current to the gaseous nitrogen separated at the head of the column under a low pressure, and is then expanded in valve 56 to 1.3 bars absolute and introduced as a reflux at the top of this column.

A second part of the nitrogen separated in column 25 is drawn off in the gaseous state at the head of this column by pipe 57; it is liquefied in the exchanger 58 by indirect heat exchange with the liquid containing 70% oxygen drawn off by the pump 70 and the pipe 71 from the column 50 under a low pressure, then added by the pipe 59 to the nitrogen drawn off directly in liquid form from the column 25 by the pipe 53A and taken with it to the head of column 50 where it provides the liquid reflux.

Finally, a third part of the nitrogen separated at the head of the column under pressure 25, that is about 19 to 20% of the total amount of air, is used to provide the cold output required for the operation of the installation. It is drawn off for this purpose by the pipe 60, warmed to around —156° C. by heat exchange with the fraction of air under a relatively high pressure in the exchanger 32, then introduced by the pipe 61 into the expansion turbine 62, where it expands with external work to 1.3 bars absolute. It is then added by the pipe 63 to the nitrogen at low pressure from the top of the rectification column 50.

This last column which as has been seen, comprises an upper section 51 and a lower section 52, allows the separation of air and the liquid rich in oxygen which are introduced into it, into 99.5% oxygen, oxygen-rich air containing 70% oxygen, and residual nitrogen.

The 99.5% oxygen drawn off as a liquid from the sump at the lower part 52 of the column, by pipe 64, is fed by the circulation pump 65 to the filter set 41A, 41B, designed to eliminate any last traces of impurities such as acetylene which might have escaped the preceding purification devices. Then it is passed by pipe 66 to the condenser-vaporizer 36 mounted in the upper part of the column under pressure 25, where it vaporizes; a first part is sent by the pipe 67 to the bottom of the column under a low pressure 50; another part is drawn off by the pipe 68 to the (non-reversing) channels 23 of the reversing exchanger 20, from which it leaves warmed up to around atmospheric temperature; it is carried off to the point of use by pipe 69.

The liquid containing about 70% oxygen drawn off from the bottom of the section 51 of the column 50 is delivered by the pump 70 and the pipe 71 to a filter set 42A, 42B, designed also to eliminate residual impurities in suspension, then is vaporized in the exchanger 58 by heat exchange with the gaseous nitrogen from the column under pressure 25, as already mentioned. It then goes by pipes 72 to 76 to the reversing exchanger 20; a fraction of it is however previously diverted before the valve 73, by the pipe 74, warmed up by heat exchange with the fraction of air at 15 bars, then rejoined by pipe 75 to the principal fraction. In the reversing exchanger 20, the oxygen-rich air containing 70% oxygen flows alternately through one or the other of the group of channels 21, 22 by means of a valve system 77A, 77B, 78A, 78B, the flows of oxygen-rich air and of the air to be separated being periodically alternated. The oxygen-rich air warmed up to around atmospheric temperature is finally taken off to the point of use by pipe 79.

The residual nitrogen drawn off from the head of the column under a low pressure 50 by the pipe 80 is successively warmed up in the exchangers 55 and 38, in counter-current to the liquid nitrogen and the oxygen-rich liquid from the column under pressure 25. It is added at the inlet to the second exchanger to the cold nitrogen coming from the expansion turbine 62. Then it is taken by the pipe 82 to the two groups of regenerators 4A, 4B and 12A, 12B, between which it is divided into flow rates corresponding to the flow rates of air to be cooled. Introduced into these groups of regenerators respectively by the pipes 83 and 84, it is drawn off after warming up to around atmospheric temperature via pipes 85 and 86 into pipe 87.

It will be understood that various modifications can be made to the apparatus described without departing from the scope of the invention. In particular, the sets of regenerators and the reversing exchanger have only been described by way of example, and the cooling of the main fraction of the air can be provided by regenerators alone or by reversing exchangers alone, or even by ordinary exchangers, in which case a prior purification of the air to be separated is carried out (drying and carbon dioxide removal). The expansion with external work of nitrogen for the cold output may be replaced by an expansion of a fraction of the air to be separated. The circuit for air under relatively high pressure may be suppressed, the warming of the nitrogen before its admission to the expansion turbine then being effected by passing it through special channels in the regenerators or the reversing exchanger.

FIGURE 2 of the attached drawing represents a modification of part of the apparatus described above.

In this case, the nitrogen drawn off by the pipe 60, instead of all being warmed in exchanger 32, is divided into two fractions, of which the first one goes through valve 88 and passes through the exchanger 32, and then goes by pipe 61 to the expansion turbine 62, whilst the other fraction goes through valve 89 and pipe 60A, to be warmed up by its passage through additional channels 21A of the reversing exchanger 20, and is then added by pipe 61A to the first fraction coming from the exchanger 32.

The additional channels 21A are non-reversing, and extend from the cold end of exchanger 20 up to about the mid-point of this exchanger, corresponding to a temperature substantially of $-95°$ C.

What we claim is:

1. A process of separating oxygen and oxygen-rich air containing more than about 40% oxygen, by liquefaction and rectification of air at low temperature in at least two columns under different pressures in indirect heat exchange, in which the air is separated in the rectification column under a higher pressure—on one hand into a high pressure liquid rich in oxygen, of which a first part is expanded and introduced into the column under a lower pressure, and a second part is expanded and vaporized by heat exchange with a gas poorer in oxygen, and then introduced into the column under a lower pressure—and on the other hand into gaseous nitrogen, of which a first part of nitrogen is liquefied by heat exchange with the liquid oxygen from the column under a lower pressure, and a second part of nitrogen by heat exchange with the liquid rich in oxygen from the low pressure column, characterised in that the gas poorer in oxygen used to effect the vaporisation of the second part of the expanded liquid rich in oxygen from the column under a higher pressure is air under a pressure intermediate those of the two columns, which after its liquefaction is introduced into at least a rectification column, and in that the liquid rich in oxygen from the low pressure column used to effect the liquefaction of the second part of the nitrogen is at least part of the oxygen-rich air to be separated and not yet vaporized in the low pressure column.

2. A process according to claim 1, characterised in that at least the greater part of the air liquefied under a pressure intermediate those of the two columns is brought in the liquid state to a pressure at least equal that of the column under a higher pressure, and then introduced into the latter.

3. A process according to claim 1, characterised in that the liquid rich in oxygen from the low pressure column is brought to a higher pressure than that of the column under a low pressure before its vaporization by heat exchange with the second part of the gaseous nitrogen.

4. A process according to claim 1, characterised in that the cold output required for the separation of the air is provided by expansion with external work of a third part of the gaseous nitrogen separated in the column under a higher pressure, which is warmed up before this expansion at least in part by heat exchange with a fraction of air previously brought to a pressure appreciably higher than that of the column under a higher pressure, and purified and cooled independently of the rest of the air to be separated, then liquefied and introduced into a rectification column.

5. A process of separating air by liquefaction and rectification in a pair of rectification zones at different pressures, comprising producing in the higher pressure zone a liquid richer in oxygen than air, at least partly vaporizing said liquid in heat exchange with air at a pressure intermediate the pressure of said zones thereby at least partly to liquefy the intermediate pressure air, introducing said at least partly vaporized liquid into the lower pressure zone, and introducing said at least partly liquefied air into one of said zones.

6. A process as claimed in claim 5, and increasing the pressure of said at least partly liquefied air and introducing it into said higher pressure zone.

References Cited

UNITED STATES PATENTS

| | | | |
|---|---|---|---|
| 2,048,076 | 7/1936 | Linde | 62—39 X |
| 2,537,046 | 1/1951 | Garbo | 62—14 |
| 2,552,560 | 5/1951 | Jenny et al. | 62—29 X |
| 3,113,854 | 12/1963 | Bernstein | 62—39 X |
| 3,210,950 | 10/1965 | Lady | 62—30 X |
| 3,217,502 | 11/1965 | Keith | 62—29 X |

FOREIGN PATENTS 644,490  6/1963  Canada.

NORMAN YUDKOFF, *Primary Examiner.*

WILBUR L. BASCOMB, JR., *Examiner.*

W. V. PRETKA, *Assistant Examiner.*